United States Patent Office
3,660,448
Patented May 2, 1972

3,660,448
REACTION PRODUCTS OF SILICON MONOXIDE AND ORGANIC COMPOUNDS HAVING ACTIVE HYDROGEN ATOMS AND METHODS OF MAKING THE SAME
Erich T. Schaschel, Toledo, Ohio, assignor to Owens-Illinois, Inc.
No Drawing. Filed Mar. 3, 1970, Ser. No. 16,234
Int. Cl. C07f 7/04, 7/08, 7/18
U.S. Cl. 260—448.2 N                           18 Claims

ABSTRACT OF THE DISCLOSURE

Reaction products of silicon monoxide and active hydrogen containing organic compounds such as alcohols and amines are provided. The products, which are organo silicon polymers, are useful in coating compositions, for fillers in ceramic and plastic compositions and as stop-cock greases.

---

This invention relates to organo silicon polymers prepared by reacting silicon monoxide with organic compounds containing active hydrogen atoms such as alcohols and amines.

This invention relates to the preparation of organo silicon polymers by the reaction of silicon monoxide with organic compounds having active hydrogen atoms and methods for making the same.

It is an object of the present invention to provide new organo silicon polymers by mixing gaseous silicon monoxide in a vacuum with an organic compound having active hydrogen atoms such as ethanol to form a mixture, and condensing the mixture of gaseous silicon monoxide and organic compound to provide the organo silicon reaction product.

It is an object of the present invention to provide organo silicon polymers made by mixing gaseous silicon monoxide with gaseous organic compounds containing —O—H or —N—H groups to form a gaseous mixture, and condensing the mixture generally at about −196° to 100° C. and preferably about −196° to −70° C. to obtain the organo silicon polymer.

These and other objects will be apparent from the specification that follows and from the appended claims.

The present invention provides organo silicon polymers by reaction of silicon monoxide with active hydrogen atoms containing organic compounds such as alcohols and amines. The present invention also provides methods of making the organo silicon polymers by mixing gaseous silicon monoxide in a vacuum with an organic compound containing active hydrogens, preferably in gaseous form, to provide a mixture, and condensing the mixture to obtain the organo silicon polymers.

In general, the methods of the present invention involve the preparation of silicon monoxide vapors from commercially available solid silicon monoxide by heating the same under high vacuum (generally from about $1 \times 10^{-6}$ to about $1 \times 10^{-2}$ torr, preferably from about $1 \times 10^{-5}$ to about $5 \times 10^{-5}$ torr) to about 1200° to 1300° C., mixing in a chamber having cooled walls the gaseous silicon monoxide formed thereby with an excess of a volatile organic alcohol or amine containing active hydrogen atoms to form a mixture, and condensing the mixture to obtain the organo silicon polymer, the reaction apparently occurring on the cold surface of the chamber to form the polymer thereupon. Generally the molar ratio of organic reactant to silicon monoxide is in the range of 1.5:1 to 100:1 and preferably 20:1 to 60:1. A large excess molar amount of organic reactant promotes the insertion reaction rather than the polymerization of SiO itself.

In the present invention, according to analytical data, the silicon monoxide reacts with active hydrogen atoms of OH and NH groups according to the following general equations:

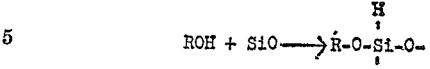

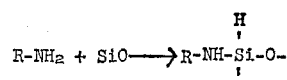

where R is preferably an alkyl group of from 1 to 12 carbon atoms or another organic radical including aromatic radicals such as phenyl, benzyl and naphthyl which are preferably unreactive to SiO.

The reaction of the present invention is in competition somewhat with the polymerization of the silicon monoxide itself. Transfer from mono-coordinated silicon in the monomeric SiO to the tetra-coordinated silicon in the reaction product is accompanied with the formation of Si—Si and Si—O—Si bridges. The resultant reaction product usually contains Si—O—Si bonds as well as sometimes Si—Si bonds. The polymer can be a highly cross-linked polysilane-siloxane containing Si—H bonds.

Silicon monoxide can be obtained commercially (as for instance from Union Carbide Corporation) and can be prepared by reducing $SiO_2$ with Si, SiC, C, $H_2$, etc. at generally a high temperature. The reduction of $SiO_2$ with Si provides maximum yield and this process is generally preferred for preparing the silicon monoxide, this process being characterized by its high reaction velocity and absence of secondary reactions that might possibly contaminate the final product. A detailed discussion of the nature and thermodynamic properties of solid silicon monoxide can be found in a monograph by N. A. Toropov, V. P. Barzakowski, High Temp. Chemistry of Silicates and Other Oxide Systems, Izd. AN SSSR, Moscow, 1963. The disclosure of this publication is hereby incorporated by reference. The preparation of silicon monoxide is also disclosed in U.S. Pats. Nos. 2,882,177 and 2,823,979 which are also incorporated by reference.

Preferred organic compounds containing active hydrogen atoms are alcohols such as methanol, ethanol, n-propanol and amines such as methyl amine, ethyl amine, n-propylamine and n-butylamine. Other suitable organic compounds containing active hydrogen atoms are hydroxyl compounds having the formula $R(OH)_n$ in which R is an aliphatic group or an aromatic group containing 1 to 12 carbon atoms and $n$ is preferably an integer from 1 to 3. Suitable specific hydroxyl compounds include alcohols such as hexanol, decanol, glycol and glycerol and phenol, catechol, resorcinol, hydroquinone and naphthol.

Suitable amines are the primary amines having the formula $R(NH_2)_n$ in which R is an aliphatic or aromatic group having 1 to 12 carbon atoms and $n$ is preferably 1 or 2, and secondary amines having the formula $R_2NH$ in which R is preferably an alkyl group preferably having 1 to 6 carbon atoms. Suitable specific primary amines are hexylamine, octylamine, aniline and naphthylamine, diamines such as ethylene diamine, tetramethylenediamine, hexamethylene diamine, phenylene diamine and naphthylene diamine. Suitable specific secondary amines are dimethylamine, diethylamine and di-propylamine.

The following examples are intended to illustrate the present invention and are not to limit the same in any way.

Preparation of organo silicon polymers by insertion reaction with silicon monoxide into —OH and —NH groups of alcohols and amines Example 1.—Ethanol was reacted with silicon monoxide by heating solid silicon monoxide at about 1200° to 1300° C. at a pressure of about 1 to $5\times10^{-5}$ torr to provide gaseous silicon monoxide. The gaseous silicon monoxide was mixed with an excess of the alcohol (molar ratio of 50 moles ethanol to 1 mole of silicon monoxide). The mixture was condensed and collected on a surface cooled with liquid nitrogen, the surface being the walls of a rotatable cylinder. The condensed mixture apparently reacted on the cooled surface to form the polymer. On warming to room temperature, the excess of unreacted alcohol was pumped off. A white solid resulted with a molecular formula of $C_2H_5OH(SiO)_{3.5}$. The polymer was insoluble in inert solvents and infusible. The yield based on the silicon monoxide condensed on the cold trap was 100%. The polymer was used as a filler in plastic compositions including organopolysiloxane compositions and as a stop-cock grease.

Example 2.—n-Butyl amine was reacted with silicon monoxide with a molar ratio of 50 moles of n-butyl amine to 1 mole of silicon monoxide using the methods described in the previous example.

A brown solid with a molecular formula corresponding to $C_4H_9NH_2\cdot(SiO)_4$ was recovered from the quenching trap. It was insoluble in inert solvents and infusible. The yield based on the silicon monoxide condensed onto the surface was 100%. This material is used as a filler in an organopolysiloxane composition useful for molded objects and coatings. The infusible polymer was used in amounts of about 5 parts by weight per 100 parts by weight of the organopolysiloxane polymer.

In the above examples, other organic compounds having active hydrogen atoms previously described such as propanol and ethyl amine can be used in place of the ethanol and n-butyl amine in the above examples to provide substantially equivalent results.

What is claimed is:

1. A reaction product of one mole of silicon monoxide and about 1.5 to 100 moles of an organic compound containing an active hydrogen atom in the group consisting of alcohols and amines, the SiO and organic compound being mixed at a pressure of about $1\times10^{-6}$ to $1\times10^{-2}$ torr to form a mixture that is condensed at about $-196°$ to 100° C. to provide the reaction product.

2. An organo silicon polymer having a molecular chain with (—Si—O—) units prepared by the reaction of one mole of silicon monoxide with about 1.5 to 100 moles of an organic compound of the group consisting of amines and alcohols, the amines having the formula $R(NH_2)_n$ or $R_2NH$ where $n$ is an integer between 1 and 2 and R is an aliphatic or aromatic group containing 1 to 12 carbon atoms and the alcohols having the general formula $$R(OH)_n$$

where $n$ is an integer between 1 and 3 and R is an aliphatic or aromatic group containing 1 to 12 carbon atoms, the SiO and organic compound being mixed at a pressure of about $1\times10^{-6}$ to $1\times10^{-2}$ torr to form a mixture that is condensed at about $-196°$ to 100° C. to provide the polymer.

3. A method of preparing an organo silicon polymer comprising reacting one mole of silicon monoxide with about 1.5 to 100 moles of an organic compound that is an alcohol or an amine, the SiO and organic compound being mixed at a pressure of about $1\times10^{-6}$ to $1\times10^{-2}$ torr to form a mixture that is condensed at about $-196°$ to 100° C. to provide the polymer.

4. A method of preparing an organo silicon polymer comprising the steps of mixing one mole of gaseous silicon monoxide and about 20 to 60 moles of an organic compound having an active hydrogen atom that is a compound of the group consisting of alcohols and amines in a vacuum at a pressure of about $1\times10^{-5}$ to $5\times10^{-5}$ torr to form a mixture, condensing the mixture at about $-196°$ $-70°$ C. to provide the organo silicon polymer that is a reaction product of silicon monoxide and the organic compound.

5. The reaction product as defined in claim 1 in which the organic compound is an alcohol.

6. A reaction product of one mole of silicon monoxide and about 1.5 to 100 moles of ethanol.

7. A reaction product of one mole of silicon monoxide and about 1.5 to 100 moles of n-butylamine.

8. A method for preparing an organo silicon polymer comprising the steps of
   (1) mixing one mole of gaseous silicon monoxide at a pressure of about $1\times10^{-6}$ to $1\times10^{-2}$ torr with about 1.5 to 100 mole of a gaseous organic compound having an active hydrogen atom of the group consisting of alcohols of the general formula $R(OH)_n$ where $n$ is an integer between 1 and 3 and R is an aliphatic or aromatic group containing 1 to 12 carbon atoms, and amines of the formula $R(NH_2)_n$ or $R_2NH$ where $n$ is an integer between 1 and 2 and R is an aliphatic or aromatic group containing 1 to 12 carbon atoms to form a mixture, and
   (2) condensing the mixture of a temperature of about $-196°$ to 100° C. to provide the organo silicon polymer.

9. A reaction product as defined in claim 1 in which the organic compound is an amine.

10. A method as defined in claim 8 in which the molar ratio of organic compound to silicon monoxide is about 20:1 to 60:1.

11. A method as defined in claim 8 in which the molar ratio of organic compound to silicon monoxide is about 50:1.

12. A method of preparing an organo silicon polymer comprising the steps of
   (1) heating solid silicon monoxide to about 1200° to 1300° C. in a vacuum to form gaseous silicon monoxide, mixing the one mole of gaseous silicon monoxide and about 1.5 to 100 moles of a gaseous organic compound having an active hydrogen atom in a vacuum to form a mixture, the organic compound having an active hydrogen atom-containing group consisting of alcohols of the general formula $R(OH)_n$ where $n$ is an integer between 1 and 3 and R is an aliphatic or aromatic group containing 1 to 12 carbon atoms, and amines of the formula $R(NH_2)_n$ or $$R_2NH$$

where $n$ is an integer between 1 and 2 and R is an aliphatic or aromatic group containing 1 to 12 carbon atoms, and
   (2) condensing the mixture at a temperature of about $-196°$ to 100° C. to obtain the polymer having a molecular chain containing (—Si—O—) units.

13. A method as defined in claim 12 in which the vacuum has a pressure of about $1\times10^{-6}$ to $1\times10^{-2}$ torr and the condensing of the mixture is at a temperature of about $-196°$ to $-70°$ C.

14. A method as defined in claim 8 in which the pressure is at about $1\times10^{-5}$ torr to $5\times10^{-5}$ torr.

15. A method as defined in claim 8 in which the organic compound is ethanol.

16. A method as defined in claim 8 in which the organic compound is propanol.

17. A method as defined in claim 8 in which the organic compound is n-butyl amine.

18. A method as defined in claim 8 in which the organic compound is ethyl amine.

No references cited.

TOBIAS E. LEVOW, Primary Examiner

P. F. SHAVER, Assistant Examiner

U.S. Cl. X.R.

117—124 F, 147; 252—49.6; 260—375 B, 46.5 R, 448.2 D, 448.2 E, 448.2 P, 448.2 H, 448.2 R, 448.8 R